United States Patent
Fox-Rabinovitz et al.

(10) Patent No.: US 12,428,172 B2
(45) Date of Patent: Sep. 30, 2025

(54) UNMANNED AERIAL VEHICLES WITH HIGH-SPEED LIFTOFF CAPABILITIES

(71) Applicant: Torc Robotics, Inc., Blacksburg, VA (US)

(72) Inventors: Joseph R. Fox-Rabinovitz, Blacksburg, VA (US); William Davis, Blacksburg, VA (US)

(73) Assignee: TORC Robotics, Inc., Blacksburg, VA (US)

(*) Notice: Subject to any disclaimer, the term of this patent is extended or adjusted under 35 U.S.C. 154(b) by 0 days.

(21) Appl. No.: 18/408,901

(22) Filed: Jan. 10, 2024

(65) Prior Publication Data

US 2025/0223058 A1    Jul. 10, 2025

(51) Int. Cl.
  *B64U 10/25*   (2023.01)
  *B64U 10/60*   (2023.01)
  *B64U 70/93*   (2023.01)

(52) U.S. Cl.
  CPC ............. *B64U 10/25* (2023.01); *B64U 10/60* (2023.01); *B64U 70/93* (2023.01); *B64U 2201/10* (2023.01)

(58) Field of Classification Search
  CPC ........ B64U 10/25; B64U 10/60; B64U 70/93; B64U 2201/10; B64U 2101/66; B64F 1/32; B64D 1/22; G06Q 10/08355
  See application file for complete search history.

(56) References Cited

U.S. PATENT DOCUMENTS

| | | | |
|---|---|---|---|
| 9,718,564 B1* | 8/2017 | Beckman | G08G 5/57 |
| 10,514,690 B1* | 12/2019 | Siegel | G05D 1/0027 |
| 10,538,190 B1* | 1/2020 | Metellus | B60F 5/02 |
| 10,538,340 B1* | 1/2020 | Roup | G08G 5/26 |
| 10,730,626 B2* | 8/2020 | Gil | G06Q 10/0833 |
| 10,977,599 B2* | 4/2021 | Yangourazov | G07F 17/12 |
| 10,988,069 B2* | 4/2021 | Vincent | B65G 13/02 |

(Continued)

FOREIGN PATENT DOCUMENTS

WO    2016164577 A1    10/2016

OTHER PUBLICATIONS

Galarza, Daniela, "San Francisco Declares War on Food Delivery Robots", May 17, 2017, eater.com, 3 pages (Year: 2017).

(Continued)

*Primary Examiner* — Medhat Badawi
(74) *Attorney, Agent, or Firm* — Armstrong Teasdale LLP

(57) ABSTRACT

Disclosed herein are unmanned aerial vehicles (UAVs) with high-speed liftoff systems, as well as delivery systems and methods using the same. The delivery system includes an autonomous vehicle, a first UAV, and a UAV control system configured to control the first UAV. The autonomous vehicle includes an autonomy computing system configured to control operation of the autonomous vehicle while the autonomous vehicle is in motion, the autonomous vehicle containing an inventory including a plurality of units. The UAV system is configured to control the first UAV to, while the autonomous vehicle is in motion, control the first UAV to: stabilize in an equilibrium motion relative to the autonomous vehicle while the first UAV is coupled to the autonomous vehicle, engage a first unit of the plurality of units, and disengage from the autonomous vehicle with the first unit engaged therewith.

18 Claims, 8 Drawing Sheets

(56) References Cited

U.S. PATENT DOCUMENTS

| | | | |
|---|---|---|---|
| 11,157,866 B2* | 10/2021 | Bostick | G06Q 10/08355 |
| 11,402,837 B1 | 8/2022 | Siegel et al. | |
| 11,542,037 B2* | 1/2023 | Brown | B64U 10/50 |
| 11,565,807 B1* | 1/2023 | Zuckerman | B64F 1/362 |
| 11,738,867 B2* | 8/2023 | Ehasoo | B60L 5/18 |
| | | | 244/17.11 |
| 11,748,688 B2* | 9/2023 | Ur | B64C 39/024 |
| | | | 705/332 |
| 11,858,662 B2* | 1/2024 | Gil | B64U 70/70 |
| 2012/0280080 A1* | 11/2012 | Lubenow | B64U 10/25 |
| | | | 244/49 |
| 2015/0120094 A1* | 4/2015 | Kimchi | G08G 5/55 |
| | | | 701/3 |
| 2016/0364989 A1* | 12/2016 | Speasl | G08G 5/57 |
| 2017/0090484 A1* | 3/2017 | Obaidi | G06Q 30/0185 |
| 2017/0297711 A1* | 10/2017 | Bernhardt | B64D 37/32 |
| 2018/0194267 A1* | 7/2018 | Helou, Jr. | B60P 3/42 |
| 2019/0161190 A1* | 5/2019 | Gil | E05F 15/77 |
| 2020/0019925 A1* | 1/2020 | Tokhtabaev | H04W 4/44 |
| 2020/0043108 A1 | 2/2020 | Faigin et al. | |
| 2020/0070717 A1 | 3/2020 | Garden et al. | |
| 2020/0082330 A1* | 3/2020 | Lesser | G06Q 10/0832 |
| 2020/0160265 A1* | 5/2020 | Urban | G06Q 10/08 |
| 2020/0167722 A1* | 5/2020 | Goldberg | G08G 5/26 |
| 2021/0053407 A1* | 2/2021 | Smith | B65G 69/2882 |
| 2021/0107684 A1* | 4/2021 | Le Lann | B60L 53/52 |
| 2021/0229811 A1* | 7/2021 | Martino | B64U 30/10 |
| 2021/0279678 A1* | 9/2021 | Ur | G06Q 10/08355 |
| 2021/0295245 A1* | 9/2021 | Ogura | G05D 1/0212 |
| 2021/0387808 A1* | 12/2021 | Kalouche | G06Q 10/083 |
| 2022/0126994 A1* | 4/2022 | Tang | B64C 5/06 |
| 2022/0171388 A1* | 6/2022 | Yanagihashi | B65G 43/00 |
| 2022/0180419 A1* | 6/2022 | Ferguson | G06Q 20/18 |
| 2022/0236745 A1* | 7/2022 | Fagiano | G05D 1/085 |
| 2022/0262260 A1* | 8/2022 | Gur | B61L 23/041 |
| 2022/0297939 A1* | 9/2022 | Chen | B60P 1/6436 |
| 2022/0355840 A1* | 11/2022 | Tenne | H04W 4/38 |
| 2022/0355929 A1* | 11/2022 | Gil | B64C 17/02 |
| 2023/0008634 A1* | 1/2023 | Kabakov | B64F 1/007 |
| 2023/0031028 A1* | 2/2023 | Ehasoo | B64U 80/10 |
| 2023/0037502 A1* | 2/2023 | Ratajczak | G08G 5/55 |
| 2023/0174218 A1* | 6/2023 | Alexandroni | B64C 5/12 |
| | | | 244/49 |
| 2023/0202682 A1* | 6/2023 | Kiyokami | B64U 70/90 |
| | | | 244/114 R |
| 2024/0111305 A1* | 4/2024 | Bradley | B64U 10/13 |
| 2024/0111310 A1* | 4/2024 | Ehasoo | B64U 70/20 |
| 2024/0253828 A1* | 8/2024 | McCann | A01C 7/085 |
| 2024/0286773 A1* | 8/2024 | Humann | B64U 10/60 |
| 2024/0400241 A1* | 12/2024 | Lede | B64U 80/40 |
| 2024/0402706 A1* | 12/2024 | Vidhi | G05D 1/0217 |
| 2024/0406564 A1* | 12/2024 | di Clare | B64U 80/30 |
| 2024/0409213 A1* | 12/2024 | Lewin | B64F 1/32 |
| 2024/0417054 A1* | 12/2024 | Van Wiemeersch | B64U 10/60 |
| 2024/0424972 A1* | 12/2024 | Moser | B64U 70/93 |
| 2025/0002183 A1* | 1/2025 | Sakaguchi | B64U 60/50 |
| 2025/0010988 A1* | 1/2025 | Pushp | B64U 10/25 |
| 2025/0013958 A1* | 1/2025 | Nakanishi | G06Q 10/06316 |
| 2025/0042542 A1* | 2/2025 | Smeenk | B64C 3/16 |
| 2025/0046940 A1* | 2/2025 | Bell | H01M 50/269 |

OTHER PUBLICATIONS

Richards, Janelle, "Robots Could Change the Face of Food Delivery", Mar. 10, 2017, nbcnews.com, 6 pages (Year: 2017).

Eliport Editorial Team, "The Top Ten Autonomous Delivery Solutions of 2018"; Apr. 2, 2018, medium.com. Eliport Blog, 18 pages Year: 2018).

Raeder, Emily, "Bringing the Convenience Store to Your Door", Jul. 21, 2021, foodondemand.com, 7 pages. (Year: 2021).

* cited by examiner

UNMANNED AERIAL VEHICLES WITH HIGH-SPEED LIFTOFF CAPABILITIES

TECHNICAL FIELD

The field of the disclosure relates generally to cargo delivery and, more specifically, to delivery of cargo using unmanned aerial vehicles (UAVs) from an in-motion cargo vehicle.

BACKGROUND OF THE INVENTION

Cargo delivery between hubs is frequently facilitated using road-based cargo vehicles, including tractor-trailers or "semi-trucks." These cargo vehicles traverse routes between hubs, such as between manufacturing plants, from a plant to a warehouse, between warehouses, from a warehouse to a wholesaler, and the like, to deliver large cargo loads therebetween. Notably, however, this hub-to-hub delivery paradigm is somewhat limited, in that the cargo vehicles are often traversing large distances between endpoints, during which the cargo is inaccessible.

The last-mile portion of delivery, from a hub to a consumer's home or workplace, is recognized as a significant time and cost sink. In many cases, the last-mile delivery is performed in a direction opposite to the delivery route traversed by the cargo vehicle, or the ultimate delivery location is significantly closer to the delivery route of the cargo vehicle than the hub.

There is a need, therefore, for delivery opportunities during the middle mile, or while the cargo vehicle is traversing its hub-to-hub delivery route, without sacrificing the efficiencies of large-scale cargo delivery.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, the disclosed delivery system includes an autonomous vehicle, a first unmanned aerial vehicle (UAV), and a UAV control system configured to control operation of the first UAV. The autonomous vehicle includes an autonomy computing system configured to control operation of the autonomous vehicle while the autonomous vehicle is in motion, and the autonomous vehicle contains an inventory including a plurality of units. The UAV control system is configured to, while the autonomous vehicle is in motion, control the first UAV to: (i) stabilize in an equilibrium motion relative to the autonomous vehicle while the first UAV is coupled to the autonomous vehicle, (ii) engage a first unit of the plurality of units, and (iii) disengage from the autonomous vehicle with the first unit engaged therewith.

In another aspect, the disclosed method includes controlling, by an autonomy computing system, an autonomous vehicle in motion, the autonomous vehicle containing an inventory, the inventory including a plurality of units. The method also includes controlling, by a UAV control system, a first UAV to: (i) stabilize in an equilibrium motion relative to the autonomous vehicle while the first UAV is coupled to the autonomous vehicle, (ii) engage a first unit of the plurality of units, and (iii) disengage from the autonomous vehicle with the first unit engaged therewith.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
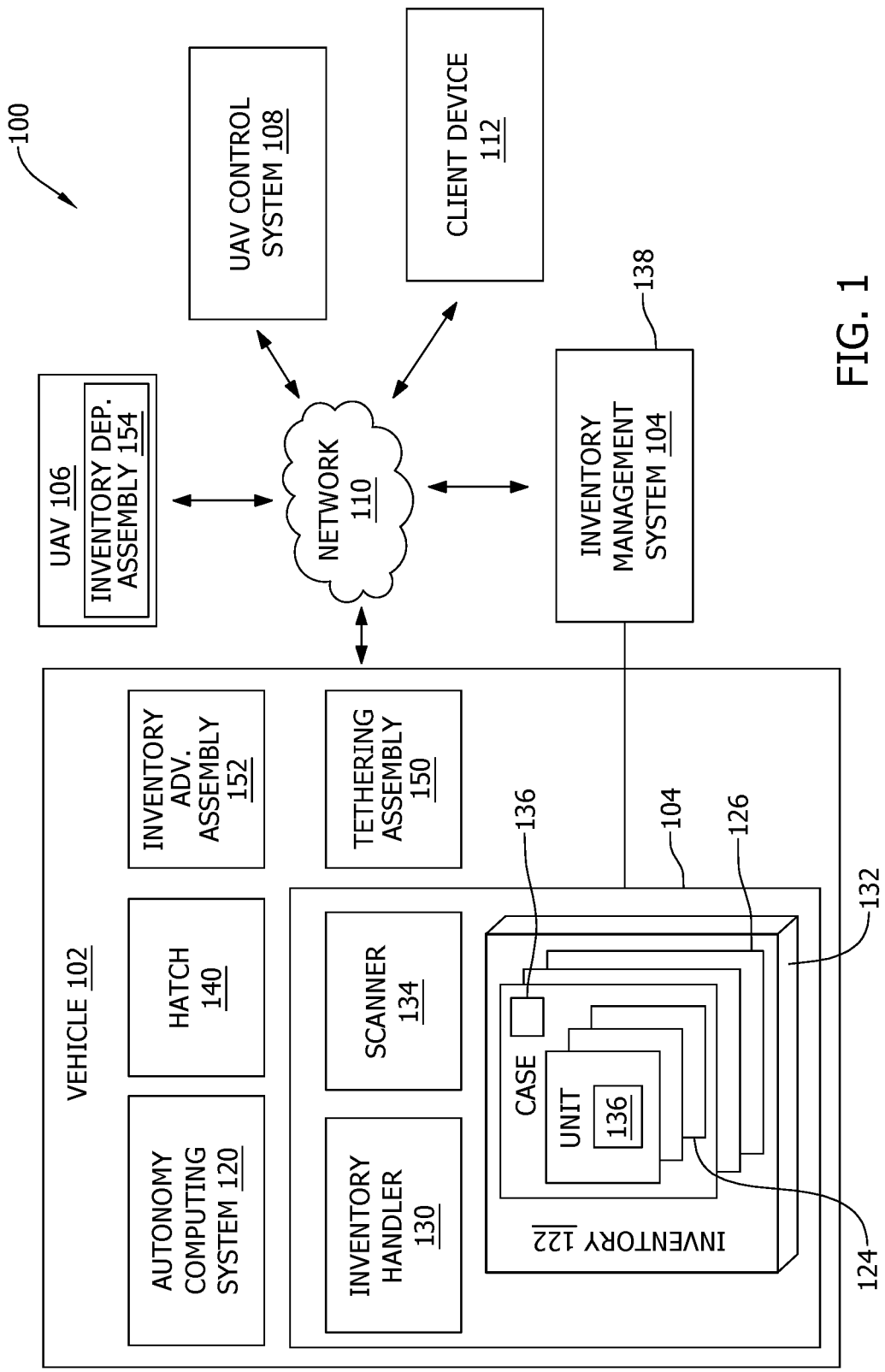
FIG. 1 is a block diagram of an embodiment of a delivery system.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

Embodiments of the disclosed delivery system are directed to middle-mile cargo delivery using unmanned aerials vehicles (UAVs). The use of the phrase "middle mile," with respect to the present disclosure, refers to the location of cargo somewhere between an initial pick-up location and an ultimate delivery location. In particular, the cargo represents inventory within a cargo vehicle, such as a tractor-trailer. The cargo vehicle is responsible for picking up a predetermined large amount of cargo for delivery along a delivery route between hubs, such as between manufacturing plants, from a plant to a warehouse, between warehouses, from a warehouse to a wholesaler, and the like. The cargo within the cargo vehicle is in its "middle mile" location while the cargo vehicle is traversing its delivery route—that is, while the cargo vehicle is in motion. Accordingly, with respect to the present disclosure, UAVs are controlled to pick up cargo from the in-motion cargo vehicle, for delivery to locations other than the hubs of the cargo vehicle, such as to the homes or workplaces of individual consumers.

In the example embodiment, the delivery system of the present disclosure is implemented with respect to an autonomous vehicle or, more specifically, an autonomous cargo vehicle. The autonomous cargo vehicle is controlled by an autonomy computing system, as described in greater detail herein. In particular, the autonomous cargo vehicle is controlled to operate at high speeds, including such speeds as greater than 40 miles per hour (MPH), 50 MPH, 60 MPH, or 65 MPH, referred to generally herein as highway speeds. It should be understood that the autonomous cargo vehicle is frequently traveling at various speeds, including highway speeds as well as non-highway speeds, and the present disclosure is not limited thereby.

In at least some embodiments, the delivery system of the present disclosure functions substantially independently of the autonomy control system. That is, although the delivery system may communicate with the autonomy control system, such as to receive data therefrom or transmit data thereto, the delivery system, in many embodiments, does not affect the functionality of the autonomy computing system to operate the autonomous cargo vehicle according to predetermined conditions.

In particular, the UAVs—also referred to as drones—are controlled to pick up units of cargo from the autonomous cargo vehicle, while the autonomous cargo vehicle is in motion, including at highway speeds. The delivery system of the present disclosure includes a UAV control system, which is configured to control the operation of one or more UAVs, as described in greater detail herein, to pick-up one or more units of cargo and deliver the unit(s) to an ultimate delivery location (other than a hub delivery location of the cargo vehicle). The UAV control system includes hardware computing and communication components as well as a software ecosystem implemented on-board the cargo vehicle, on-board the UAV(s), remotely from the cargo vehicle or UAV(s) (e.g., as a cloud-based server implementation), or in a distributed manner therebetween.

The present disclosure is further directed to a UAV with high-speed liftoff capabilities. In particular, the drones or UAVs described herein are capable of retrieving cargo from an in-motion autonomous cargo vehicle at highway speeds.

This delivery system is enabled, in part, using an inventory management system. The inventory management system includes the hardware components implemented within the cargo vehicle to maneuver cargo, referred to broadly as inventory handlers. Inventory handlers may include, without limitation, conveyors or similar track-based movement systems, robotic arms, lifts, gantries, rollers, and the like. The inventory management system also includes any stationary cargo storage components, such as cases (e.g., pallets, boxes, cartons) and shelving. The inventory management system further includes cargo tracking components, including scanners, for tracking the location and position of cargo within the cargo vehicle. In addition, the inventory management system includes hardware computing and communication components as well as a software ecosystem that may be implemented on-board the cargo vehicle, remotely from the cargo vehicle (e.g., as a cloud-based server implementation), or in a distributed manner therebetween. The software ecosystem facilitates control of the hardware components of the inventory management system, as described in further detail herein, as well as various communication functions between other systems and devices, such as the autonomy computing system of the cargo vehicle, a UAV control system, remote (client) devices, and the like.

FIG. 1 is a block diagram depicting an example embodiment of a delivery system 100. Delivery system 100 includes an automated cargo vehicle (ACV) 102. Delivery system 100 also includes an inventory management system 104, one or more UAVs 106, and a UAV control system 108. ACV 102, inventory management system 104, UAV 106, and UAV control system 108 are communicatively connected via a network 110. One or more remote client devices 112 (e.g., smart phone, laptop, desktop, tablet, etc.) may communicate with one or more components of delivery system 100, specifically inventory management system 104, via network 110.

ACV 102 includes a vehicle autonomy computing system 120 that controls operation of ACV 102. Additionally, ACV 102 houses cargo 122 being delivered between hubs according to a delivery route. Cargo 122 is also referred to herein as inventory 122. In the example embodiment, inventory 122 includes a plurality of units 124 housed in a plurality of cases 126. Units 124 and cases 126 can be any suitable inventory. In some embodiments, cases 126 are stacked upon one another or otherwise stored in a complementary fashion. Units 124 are arranged within cases 126, and may be stacked upon one another, arranged in a single layer, arranged randomly (e.g., as a pile), or otherwise. In some particular embodiments, units 124 or cases 126 include complementary engagement features such that units 124 or cases 126 exhibit relatively high lateral and longitudinal stability. In such cases, units 124 or cases 126 are prevented from substantial lateral and longitudinal movement. In at least some of these embodiments, units 124 or cases 126 are otherwise relatively easy to lift, or are not prevented from relative vertical motion. Thereby, units 124 or cases 126 may be maneuvered, in part, using lifting components. In some embodiments, inventory 122 includes similar cases 126 and units 124. That is, ACV 102 may be delivering (to a hub) a single type of inventory. In other embodiments, ACV 102 includes a plurality of different types of inventory, such that cases 126 and units 124 vary.

Inventory management system 104 is at least partially retained in ACV 102. Specifically, at least the hardware components used for storing, moving, and tracking inventory 122 within ACV 102 is housed in ACV 102. Inventory management system 104 includes at least one inventory handler 130 in ACV 102. Inventory handler 130 includes any component(s) configured to move and position inventory 122 within or relative to ACV 102, such as lift(s), robotic arm(s), conveyor(s), and the like. Inventory management system 104 also includes storage component(s) 132, including any stationary components configured to retain inventory 122 in a predefined storage position (e.g., shelves, racks, or rails).

Inventory management system 104 also includes a scanner 134. Scanner 134 may include any scanning component(s) configured to track the placement and movement of inventory 122 within ACV 102. In particular, units 124 and cases 126 each include respective computer-readable identifiers 136, which are uniquely associated with that particular unit 124 or case 126 and are readable using scanner 134. Computer-readable identifiers 136 may include, for example, RFID tags, such that scanner 134 may read identifiers 136 without particular concern to moderate movement of unit 124 or case 126 (e.g., if there is a bump in the road, or the unit 124 is being buffeted by wind).

Likewise, scanner 134 includes one or more RFID scanners positioned in strategic locations throughout ACV 102. Additionally, or alternatively, identifiers 136 include barcodes, QR codes, or other suitable computer-readable identifiers. Therefore, scanner 134 may additionally or alternatively include barcode scanner(s), QR code scanner(s), cameras, optical scanners, or any other suitable scanning device for object tracking (e.g., localization, identification), including scanner(s) trained with image processing techniques to recognize objects (such as units 124, cases 136) based on physical properties thereof (such as shape, color, size, etc.). In some embodiments, one or more of inventory handlers 130 include a scanner 134 coupled thereto. In this way, the location and movement of unit(s) 124 of inventory 122 can be precisely tracked during middle-mile processing within ACV 102.

In the example embodiment, inventory management system 104 is local to ACV 102. In other embodiments, inventory management system 104 also includes a remote environment 138 in which data management and processing is primarily performed remotely from ACV 102, such as in a cloud computing environment at a remote server. In still other embodiments, inventory management system 104 is implemented in a distributed fashion.

ACV 102 also includes one or more hatches 140. Hatch 140 is an entry/exit point of ACV 102 through which unit(s) 124 of inventory 122 can be placed/removed. In the example embodiment, ACV 102 includes at least one hatch 140 on or defined through a roof or top wall of a trailer thereof. Hatch 140 includes one or more panels (not shown) that open in response to a control command from inventory management system 104 or autonomy computing system 120. Scanner 134 may be located adjacent to each hatch 140, such that unit(s) can be scanned before or during retrieval by UAV 106. ACV 102 may additionally or alternatively include at least one hatch 140 on one or more side wall(s) of the trailer. As described herein, UAV 106 is controlled to approach hatch 140 to retrieve unit(s) 124 from ACV 102. Reference herein to hatch 140 should not be construed in a limited manner. That is, ACV 102 may include multiple hatches 140, and UAVs 106 may retrieve unit(s) 124 via any one of hatch(es) 140 without limitation.

Delivery system 100 includes at least one UAV 106 and, in many embodiments, a plurality of UAVs 106. One UAV 106 may be associated with or operable to deliver inventory 122 from one ACV 102 or multiple ACVs 102. Likewise, an ACV 102 may be serviced by one UAV 106 or multiple UAVs 106. UAV 106 includes any drone or other aerial vehicle suitable to perform the functions described herein, including retrieving unit(s) 124 of inventory 122 and delivering such unit(s) 124 to a delivery location. Accordingly, as described further herein, UAV 106 includes one or more lift components and/or propulsion components enabling UAV 106 to move in a controlled manner, one or more communication components enabling control of UAV 106 by UAV control system 108, and one or more engagement components enabling UAV 106 to engage unit(s) 124 of inventory 122. The engagement components may include, for example and without limitation, hooks, cords, chains, magnets, claws, lifters, nets, pulleys, winches, and the like. In some embodiments, UAV 106 is stored within ACV 102 until UAV 106 is activated by UAV control system 108.

UAV control system 108 is configured to control the movement and operation of UAV 106, as described further herein, and includes any suitable processing, memory, and communication hardware suitable to perform these functions. In some embodiments, UAV control system 108 is primarily housed on or in UAV 106 itself, such that control of UAV 106 (e.g., docking, unit retrieval, stabilization, obstacle avoidance, etc.) is substantially or completely local to UAV 106. In some embodiments, UAV control system 108 is located remotely from UAV 106 and is implemented as a remote or distributed "cloud-based" control system, in which some aspects of UAV control are primarily performed remotely from UAV (e.g., route planning). In such embodiments, UAV 106 includes sufficient communication and computing components to receive and interpret control signals from UAV control system 108.

In operation, a consumer (not shown) operates a client device 112 to submit an order for one or more units 124 or cases 126 of inventory 122 that is retained within ACV 102, which is in motion along a cargo delivery route between hubs. In the example embodiment, the consumer is located in some delivery location that is between the hubs and is proximal to the route of ACV 102 and within the delivery range capabilities of UAV 106.

Inventory management system 104 receives an order message from client device 112 (e.g., via network 110). The order message includes, among other data, an identification of the one or more units 124 the consumer has ordered, as well as a delivery location. Inventory management system 104 parses the order message and determines whether the order can be fulfilled using inventory 122 on ACV 102. If the order cannot be fulfilled, inventory management system 104 cancels the order or otherwise notifies the consumer that the order cannot be fulfilled.

In some embodiments, inventory management server 104 controls the listing of inventory 122 such that invalid options are not made available for ordering to begin with. In some embodiments, inventory management server 104 is further configured to determine whether the order can be otherwise fulfilled. For instance, if multiple ACVs 102 are traversing the same route or are otherwise within a delivery radius of the consumer, the consumer be directed to order from a different ACV 102 or at a different time.

If the order can be fulfilled using inventory 122, inventory management system 104 calculates a pick-up time at which a UAV 106 is able to retrieve the ordered and identified unit(s) 124. In the example embodiment, inventory management system 104 interfaces with autonomy computing system 120 (e.g., via network) to retrieve information about the planned delivery route that the ACV 102 is traversing or will be traversing. This information includes, for example, speed, heading, location, and planned trajectory details of the delivery route. Inventory management system 104 uses this route information, as well as information related to the ultimate (client) delivery location and the capabilities and location of UAV 106, to calculate the pick-up time at which UAV 106 will pick up unit(s) 124.

Inventory management system 104 controls the onboard components of inventory management system 104 (e.g., inventory handlers 130) to position unit(s) 124 in a retrieval location for retrieval of the unit(s) 124 by UAV 106 at the pick-up time. More specifically, inventory management system 104 determines an initial (storage) position of unit(s) 124 within ACV 102, such as where unit(s) 124 were last located by scanner 134. Inventory management system 104 identifies a retrieval route between the initial position of unit(s) 124 and a retrieval position of unit(s) 124, such as adjacent to hatch 140 of ACV 102. Inventory management system 104 calculates the duration of the retrieval route and determines, based on this calculation, corresponding operations of inventory handler(s) 130 to position unit(s) 124 in the retrieval position at or before the pick-up time. Inventory management system 104 controls inventory handler(s) 130 according to this operation. Scanners 134 scan the identifier(s) 136 of unit(s) 124 one or more times and at one or more locations as unit(s) 124 are moved along the retrieval route. Inventory management system 104 is also configured to control operation of hatch 140 to open when unit(s) 124 are in the retrieval position or when UAV 106 is in its pick-up position to retrieve unit(s) 124.

Inventory management system 104 also transmits a retrieval signal to UAV control system 108. The retrieval signal includes the pick-up time, as well as at least some of the route information of ACV 102. UAV control system 108 parses the retrieval signal and determines, based thereon, a pick-up operation for UAV 106. For example, UAV control system 108 uses the speed, heading, and location information of ACV 102, the pick-up time, and stored data related to the capabilities of UAV 106 to determine when and how UAV 106 is to approach ACV 102 and engage ACV 102 or unit(s) 124 during pick-up. UAV control system 108 is configured to control the speed, heading, location, and position of UAV 106 according to the pick-up operation. As such, UAV control system 108 controls UAV 106 to maneuver into a pick-up or retrieval position, relative to ACV 102 and hatch 140, at the pick-up time.

In some embodiments, UAV 106 is initially coupled to or co-located with ACV 102. For instance, ACV 102 may be "equipped" with one or more UAVs 106 that are stationed on or in ACV 102 until a middle-mile delivery is initiated. In other embodiments, UAV 106 is elsewhere, such as at a UAV hub location (not shown) or performing another delivery operation when a new middle-mile delivery is initiated. Accordingly, in some instances, control of UAV 106 may include a start-up or activation operation. Control also includes, for example, controlling UAV 106 to "hover" above hatch 140 while UAV 106 is travelling at the same speed as ACV 102. As described further herein, this hovering is referred to as stabilizing UAV 106 in equilibrium motion relative to ACV 102. Specifically, UAV 106 is stabilized with the same speed and heading as ACV 102, such that relative to ACV 102, UAV 106 is not moving or is experiencing negligible movement. In some instances, where UAV 106 is initially within or atop ACV 102, UAV control system 108 controls UAV 106 to withdraw from or exit a turbulence envelope surrounding in-motion ACV 102 prior to stabilizing UAV 106. In some embodiments, UAV control system 108 controls UAV 106 to land on ACV 102 in a position relative to hatch 140 while ACV 102 is in motion.

UAV control system 108 also controls operation of the engagement components of UAV 106 to engage the unit(s) 124 for pick-up. The engagement components may engage the unit 124 outside of a body of UAV 106 and may draw the unit 124 within the body of UAV 106 before UAV 106 departs from ACV 102. Alternatively, UAV 106 may maintain the unit 124 outside of the body of UAV 106 during pick-up and delivery of unit 124.

UAV control system 108 also determines a delivery route for UAV 106 to deliver unit(s) 124 to the location of the consumer (delivery location), and controls UAV 106 to traverse the delivery route.

In some embodiments, inventory management system 104 may perform one or more of the above-described determinations or calculations related to control of UAV 106, and may transmit corresponding output to UAV control system 108 for control of UAV 106.

The above operations for middle-mile order fulfillment can be performed more than once, concurrently or sequentially, in response to a queue of orders from multiple client devices 112. Inventory management system 104 is configured to determine the sequence in which orders are fulfilled and controls inventory handler(s) 130 accordingly. Inventory management system 104 is further configured to perform any determinations or calculations to limit or restrict orders, such as determining whether ACV 102 includes suitable inventory 122, whether ACV 102 is travelling a delivery route that enables a UAV 106 to pick-up and deliver ordered unit(s) 124, whether inventory 122 is suitably arranged within ACV 102 to enable delivery within a prescribed time period, whether the order was submitted in time, etc.

Additionally, in some embodiments, inventory management system 104 and UAV control system 108 are configured to enable operation of UAV 106 within ACV 102 to perform inventory movement or pick-up operations.

In the example embodiment, delivery system 100 further includes a tethering assembly 150, an inventory advancement assembly 152, and an inventory deposit assembly 154.

Tethering assembly 150 is configured to launch UAV 106 (and, in some embodiments, any inventory unit(s) 124 engaged therewith) from ACV 102 and keep UAV 106 coupled to ACV 102 until UAV 106 has stabilized (e.g., in the manner of a kite). Tethering assembly 150 includes a tethering component or tether (610), a vehicle connector (612), and a UAV connector (614) (not shown in FIG. 1; see FIGS. 6A-7). The tether is any suitable mechanical tethering device such as a cord, rope, or chain. In some embodiments, the tether is a non-mechanical component such as a magnetic or electric field, or may include any other tether component or combination of components configured to tether UAV 106 to ACV 102 during inventory retrieval and UAV launch processes. The vehicle connector connects the tether to ACV 102 and may be a fixed connector that is not readily decoupled or removed from ACV, or a releasable connector (e.g., a hook, clasp, clamp, etc.). Likewise, the UAV connector connects the tether to UAV 106 and may be a fixed connector that is not readily decoupled or removed from ACV 102, or a releasable connector (e.g., a hook, clasp, clamp, etc.).

In some embodiments, tethering assembly 150 is implemented as a passive UAV launch assembly. In such cases, tethering assembly 150 includes the above-described components that releasably couple UAV 106 to ACV 102 during the launch of UAV 106. UAV control system 108 controls UAV 106 to withdraw from ACV 102 using a passive withdrawal routine, in which UAV 106 is controlled to withdraw from ACV 102 in a kite-like manner. In other embodiments, tethering assembly 150 includes an active launch component (not shown in FIG. 1) coupled to ACV 102, which is configured to actively launch UAV 106 from ACV 102 with an applied force, such as in a catapult-like manner. After launch, UAV 106 is stabilized in an equilibrium motion after exiting a turbulence envelope (see FIGS. 6A-7) of ACV 102, as described further herein.

In the illustrated embodiment, tethering assembly 150 is depicted as being within, on, or otherwise part of ACV 102, but it should be understood that certain components of tethering assembly 150 may be located or positioned elsewhere. For instance, in some embodiments, tethering assembly 150 is partially implemented at UAV 106.

To disconnect UAV 106 from ACV 102 such that UAV 106 can deliver unit(s) 124 from ACV 102 to a delivery location, the vehicle connector is decoupled from ACV 102 or the UAV connector is decoupled from UAV 106. In some embodiments, the vehicle connector or UAV connector includes an integrated actuation component that is remotely controllable to open the respective connector or otherwise decouple the connector from the one of the ACV 102 or UAV 106. In such cases, the actuation component is controlled by autonomy computing system 120, inventory management system 104, UAV 106, or UAV control system 108. In some embodiments, a separate component within ACV 102 decouples the vehicle connector from ACV 102, such as inventory handler 130. Thereafter, the tether is retracted into one of ACV 102 or UAV 106.

Inventory advancement assembly 152 includes components configured to advance inventory units 124 from ACV 102 to UAV 106, while UAV 106 is still coupled to ACV 102. In some embodiments, inventory advancement assembly 152 is implemented at least partially in UAV 106. For example, inventory advancement assembly 152 includes a winch that lowers the engagement component(s) of UAV 106 to hatch 140 of ACV 102. The engagement component(s) engage the inventory unit(s) 124, and the winch retracts the engagement component(s) and the inventory unit(s) 124 back to UAV 106. In some embodiments, the winch is an inventory handler 130 or other component of inventory management system 104.

In other embodiments, inventory advancement assembly 152 includes or employs the tether component of tethering assembly 150. More specifically, the inventory unit(s) 124 to be advanced to UAV 106 are coupled to the tether (e.g., by an inventory handler 130). In some instances, the vehicle connector is decoupled from ACV 102 and the tether is retracted into UAV 106, with the unit(s) 124 coupled thereto. In other instances, a separate advancement component is controlled to advance unit(s) along the tether, from ACV 102 to UAV 106. The advancement component is controlled by autonomy computing system 120, inventory management system 104, UAV 106, or UAV control system 108.

In some embodiments, inventory advancement assembly 152 is activated (e.g., by UAV 106 or UAV control system 108) to advance inventory unit(s) 124 to UAV 106 while UAV 106 is on ACV 102. In other embodiments, inventory advancement assembly 152 is activated (e.g., by UAV 106 or UAV control system 108) to advance inventory unit(s) 124 to UAV 106 after UAV 106 is launched from ACV 102 and is stabilized in its equilibrium motion.

UAV 106 includes inventory deposit assembly 154. In the example embodiment, UAV 106 employs inventory deposit assembly 154 to deposit cargo (e.g., inventory unit(s) 124) at the delivery location. In some embodiments, inventory deposit assembly 154 is the same as inventory advancement assembly 152. More particularly, where inventory advancement assembly 152 is implemented as a winch and engagement component(s) self-contained within UAV 106, the same components are used to lower unit(s) 124 from UAV 106 to the ground (or some other surface, such as a shelf) at the delivery location. The engagement component(s) are disengaged from unit(s) 124, the winch retracts the engagement component(s) back into UAV 106, and the delivery is completed. In some embodiments, UAV 106 is in motion (e.g., hovering) at the time of delivery, whereas in other embodiments, UAV 106 is controlled to land as part of the delivery routine.

In other embodiments, inventory deposit assembly 154 is separate from inventory advancement assembly 152. Inventory deposit assembly 154 may include an independent winch configured to lower engagement component(s) and unit(s) 124 to the ground (or other surface) at the delivery location and to raise and retract engagement component(s) back into UAV 106.

Figure 2:
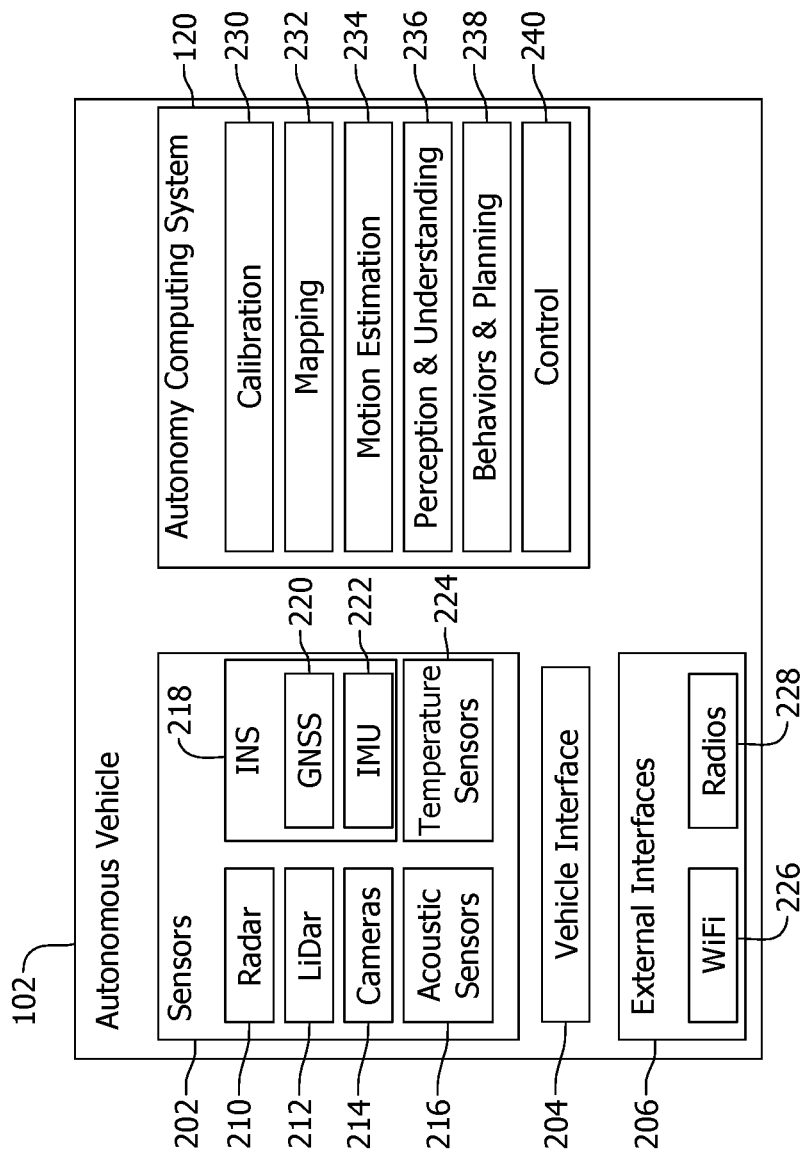
FIG. 2 is a block diagram of an embodiment of an autonomous cargo vehicle that may be used in conjunction with the delivery system shown in FIG. 1.

FIG. 2 is a block diagram of one embodiment of ACV 102. In the example embodiment, ACV 102 includes autonomy computing system 120, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 224, or inertial navigation system (INS) 218, which may include one or more global navigation satellite system (GNSS) receivers 220 and one or more inertial measurement units (IMU) 222. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of ACV 102 and its proximity. As described in further detail below, these signals may be used by autonomy computing system 120 to determine how to control operation of ACV 102. These signals, whether raw or processed by autonomy computing system 120, may additionally be used by inventory management system 104 (shown in FIG. 1) to manage middle-mile delivery requests or by UAV control system 108 to determine how to control UAV 106 to perform pick-up operations.

Cameras 214 are configured to capture images of the environment surrounding ACV 102 in any aspect or field of view (FOV). The FOV can have any angle or aspect such that images of the areas ahead of, to the side, behind, above, or below ACV 102 may be captured. In some embodiments, the FOV may be limited to particular areas around ACV 102 (e.g., forward of ACV 102, to the sides of ACV 102, etc.) or may surround 360 degrees of ACV 102. In some embodiments, ACV 102 includes multiple cameras 214, and the images from each of the multiple cameras 214 may be stitched or combined to generate a visual representation of the multiple cameras' FOVs, which may be used to, for example, generate a bird's eye view of the environment surrounding ACV 102. In some embodiments, the image data generated by cameras 214 may be sent to autonomy computing system 120 or other aspects of ACV 102, and this image data may include ACV 102 or a generated representation of ACV 102. In some embodiments, one or more systems or components of autonomy computing system 120 may overlay labels to the features depicted in the image data, such as on a raster layer or other semantic layer of a high-definition (HD) map.

LiDAR sensors 212 generally include a laser generator and a detector that send and receive a LiDAR signal such that LiDAR point clouds (or "LiDAR images") of the areas ahead of, to the side, behind, above, or below ACV 102 can be captured and represented in the LiDAR point clouds. Radar sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw radar sensor data) from the emitted radio waves. In some embodiments, the system inputs from cameras 214, radar sensors 210, or LiDAR sensors 212 may be fused or used in combination to determine conditions (e.g., locations of other objects) around ACV 102.

GNSS receiver 220 is positioned on ACV 102 and may be configured to determine a location of ACV 102, which it may embody as GNSS data, as described herein. GNSS receiver 220 may be configured to receive one or more signals from a global navigation satellite system (e.g., Global Positioning System (GPS) constellation) to localize ACV 102 via geolocation. In some embodiments, GNSS receiver 220 may provide an input to or be configured to interact with, update, or otherwise utilize one or more digital maps, such as an HD map (e.g., in a raster layer or other semantic map). In some embodiments, GNSS receiver 220 may provide direct velocity measurement via inspection of the Doppler effect on the signal carrier wave. Multiple GNSS receivers 220 may also provide direct measurements of the orientation of ACV 102. For example, with two GNSS receivers 220, two attitude angles (e.g., roll and yaw) may be measured or determined. In some embodiments, ACV 102 is configured to receive updates from an external network (e.g., a cellular network). The updates may include one or more of position data (e.g., serving as an alternative or supplement to GNSS data), speed/direction data, orientation or attitude data, traffic data, weather data, or other types of data about ACV 102 and its environment.

IMU 222 is a micro-electrical-mechanical (MEMS) device that measures and reports one or more features regarding the motion of ACV 102, although other implementations are contemplated, such as mechanical, fiber-optic gyro (FOG), or FOG-on-chip (SiFOG) devices. IMU 222 may measure an acceleration, angular rate, and or an orientation of ACV 102 or one or more of its individual components using a combination of accelerometers, gyroscopes, or magnetometers. IMU 222 may detect linear acceleration using one or more accelerometers and rotational rate using one or more gyroscopes and attitude information from one or more magnetometers. In some embodiments, IMU 222 may be communicatively coupled to one or more other systems, for example, GNSS receiver 220 and may provide input to and receive output from GNSS receiver 220 such that autonomy computing system 120 is able to determine the motive characteristics (acceleration, speed/direction, orientation/attitude, etc.) of ACV 102.

In the example embodiment, autonomy computing system 120 employs vehicle interface 204 to send commands to the various aspects of ACV 102 that actually control the motion of ACV 102 (e.g., engine, throttle, steering wheel, brakes, etc.) and to receive input data from one or more sensors 202 (e.g., internal sensors). External interfaces 206 are configured to enable ACV 102 to communicate with an external network (e.g., network 110, shown in FIG. 1) via, for example, a wired or wireless connection, such as Wi-Fi 226 or other radios 228. In embodiments including a wireless connection, the connection may be a wireless communication signal (e.g., Wi-Fi, cellular, LTE, 5g, Bluetooth, etc.). In some embodiments, ACV 102 employs external interfaces 206 to communicate information about the operation of ACV 102 to inventory management system 104 or UAV control system 108.

In some embodiments, external interfaces 206 may be configured to communicate with an external network via a wired connection, such as, for example, during testing of ACV 102 or when downloading mission data after completion of a trip. The connection(s) may be used to download and install various lines of code in the form of digital files (e.g., HD maps), executable programs (e.g., navigation programs), and other computer-readable code that may be used by ACV 102 to navigate or otherwise operate, either autonomously or semi-autonomously. The digital files, executable programs, and other computer readable code may be stored locally or remotely and may be routinely updated (e.g., automatically or manually) via external interfaces 206 or updated on demand. In some embodiments, ACV 102 may deploy with all of the data it needs to complete a mission (e.g., perception, localization, and mission planning) and may not utilize a wireless connection or other connection while underway.

In the example embodiment, autonomy computing system 120 is implemented by one or more processors and memory devices of ACV 102. Autonomy computing system 120 includes modules, which may be hardware components (e.g., processors or other circuits) or software components (e.g., computer applications or processes executable by autonomy computing system 120), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, and a control module or controller 240. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard ACV 102.

Autonomy computing system 120 of ACV 102 may be completely autonomous (fully autonomous) or semi-autonomous. In one example, autonomy computing system 120 can operate under Level 5 autonomy (e.g., full driving automation), Level 4 autonomy (e.g., high driving automation), or Level 3 autonomy (e.g., conditional driving automation). As used herein the term "autonomous" includes both fully autonomous and semi-autonomous.

While this disclosure refers to ACV 102 as an autonomous (cargo) vehicle, it is understood that ACV 102 could be any type of vehicle including a truck (e.g., a tractor trailer), an automobile, a mobile industrial machine, etc. While the disclosure will discuss a self-driving or driverless autonomous system, it is understood that the autonomous system could alternatively be semi-autonomous having varying degrees of autonomy or autonomous functionality.

Figure 3:
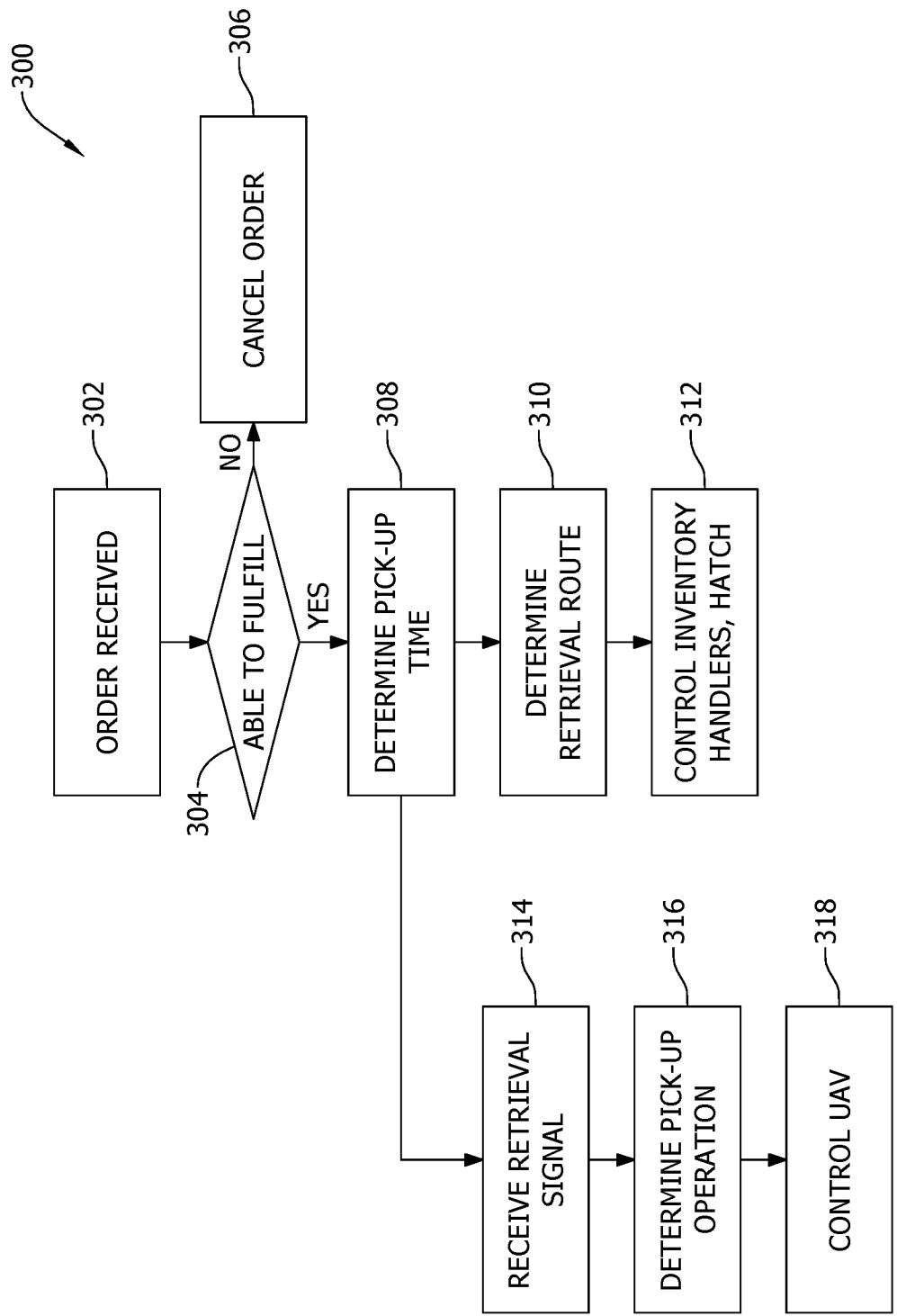
FIG. 3 is a flow diagram of a method of middle-mile delivery using unmanned aerial vehicles (UAVs), using the delivery system shown in FIG. 1.

FIG. 3 is a flow diagram of a method 300 of middle-mile delivery using UAVs (e.g., UAVs 106), using delivery system 100 (shown in FIG. 1). At least some of the steps of method 300 are performed by inventory management system 104. In some embodiments, some steps of method 300 are performed by UAV control system 108.

Inventory management system 104 receives 302 an order (e.g., from a client device 112) for one or more units 124 of inventory 122. Inventory management system 104 determines 304 whether the order can be fulfilled or not. For example, inventory management system 104 determines whether ACV 102 contains inventory 122 suitable to fulfill the order and whether ACV 102 is traversing a delivery route that enables middle-mile delivery by UAV 106. If the order cannot be fulfilled, inventory management system 104 cancels 306 the order.

If the order can be fulfilled, inventory management system 104 determines 308 a pick-up time at which UAV 106 can pick-up the ordered unit(s) 124 for delivery. This pick-up time may be determined 308 as an absolute latest time, as a threshold duration of time, as a preferred time, or in any other manner. Inventory management system 104 determines 310 a retrieval route for the ordered unit(s) 124 from their current position within ACV 102 to a retrieval position (at which unit(s) 124 can be retrieved by UAV 106) and, subsequently, controls 312 inventory handler(s) 130 to perform operations to maneuver the unit(s) 124 along the retrieval route and into the retrieval position. Inventory management system 104 also controls 312 hatch 140 to open at an appropriate time (e.g., when the unit(s) 124 are in the retrieval position or when UAV 106 is in its pick-up position to retrieve the unit(s) 124). In some embodiments, inventory management system 104 controls 312 various components thereof (e.g., inventory handler(s) 130) to operate such that unit(s) 124 are positioned in the retrieval position at substantially the same time UAV 106 is in its pick-up position. Inventory management system 104 may control 312 those components to position unit(s) 124 within a threshold period of time before or after UAV 106 is in its pick-up position, such as within a minute before or within a minute after.

Additionally, inventory management system 104 initiates operations to control UAV 106. In some embodiments, inventory management system 104 transmits a retrieval signal including the pick-up time to UAV control system 108. UAV control system 108 receives 314 the retrieval signal and, based thereon, determines 316 a pick-up operation for UAV 106. The pick-up operation includes the various operations to be performed by UAV 106 to position UAV 106 in its pick-up position, to engage the unit(s) 124, and to lift off or otherwise depart from ACV 102. UAV control system 108 controls 318 UAV 106 to perform the pick-up operations according to determination 316.

Figure 4:
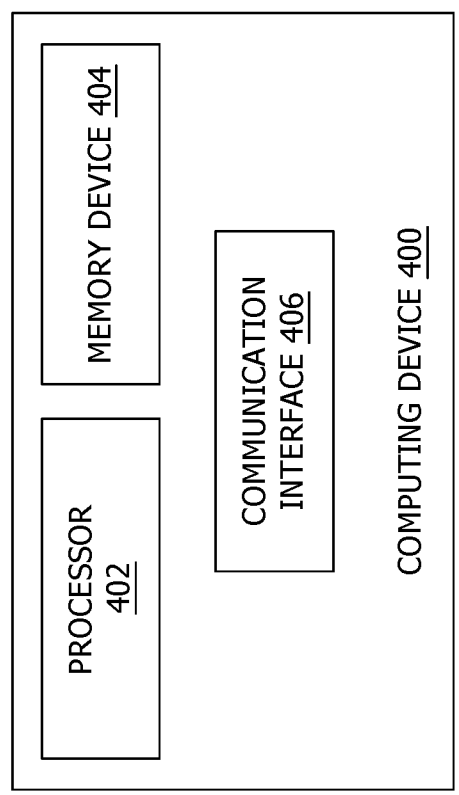
FIG. 4 is a schematic diagram of a computing device that may be used in the delivery system shown in FIG. 1.

Methods and processes described herein may be implemented on autonomy computing system 120, inventory management system 104, or UAV control system 108. Autonomy computing system 120, inventory management system 104, or UAV control system 108, as described herein, may be any suitable computing device and software implemented therein. FIG. 4 is a block diagram of an example computing device 400.

Computing device 400 includes a processor 402 for executing instructions and a memory device 404. Computing device 400, in the example embodiment, may also include a communication interface 406 that is operatively coupled to processor 402 such that computing device 400 is capable of communicating with a remote device or computing device 400, for example.

In the example embodiment, processor 402 may be programmed by encoding an operation using one or more executable instructions and providing the executable instructions in memory device 404. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition and/or meaning of the term "processor." Additionally, processor 402 may include one or more processing units (e.g., in a multi-core configuration).

In the example embodiment, memory device 404 includes one or more devices that enable information, such as executable instructions and/or other data, to be stored and retrieved. Moreover, memory device 404 includes one or more computer readable media, such as, without limitation, dynamic random-access memory (DRAM), static random-access memory (SRAM), a solid-state disk, or a hard disk. In the example embodiment, memory device 404 stores, without limitation, application source code, application object code, configuration data, input data, output data, autonomous control data, inventory management data, UAV capability data, or any other type of data. In some embodiments, memory device 404 is at least partially external to computing device 400 and may be accessed by a plurality of computing devices 400. For example, memory device 404 may include multiple storage units such as hard disks or solid-state disks in a redundant array of independent disks (RAID) configuration. In some embodiments, memory device 404 may include a storage area network (SAN) or a network attached storage (NAS) system.

In operation, computing device 400 executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

Figure 5B:
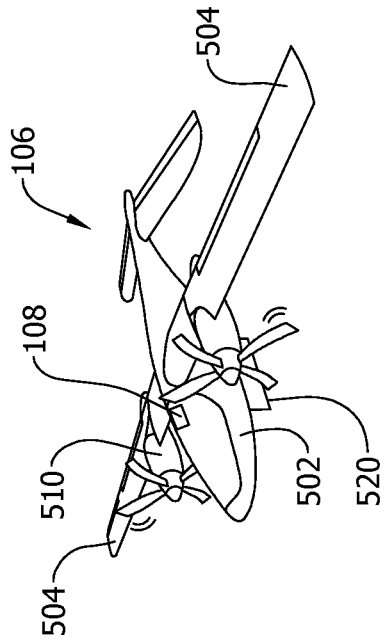
FIGS. 5A-5C depict an example embodiment of a drone or unmanned aerial vehicle (UAV) that may be used with the delivery system shown in FIG. 1.
Figure 5A:
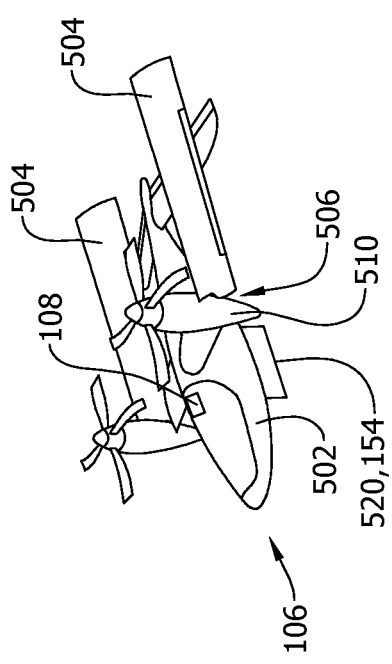
Figure 5C:
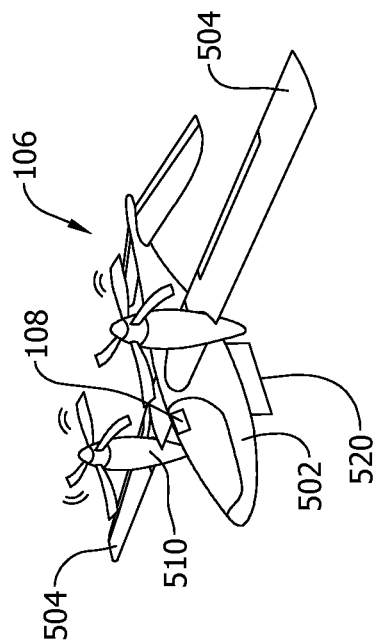

Turning to FIGS. 5A-5C, a drone or UAV 106 in accordance with the present disclosure is depicted in greater detail. In the example embodiment, UAV 106 is a fixed-wing tiltrotor drone with foldable wings. More specifically, UAV 106 includes a body 502 having a pair of wings 504 extending laterally therefrom. Wings 504 are foldable fixed wings. In particular, wings 504 are rigidly coupled to body 502 and include a respective folding axis 506 defined somewhere along a length of each wing 504. Wings 504 are selectively movable between a folded configuration (see FIG. 5A) and an unfolded configuration (see FIGS. 5B and 5C) (e.g., in response to a control signal from UAV control system 108). In the folded configuration, UAV(s) 106 may be more readily stored in or on ACV 102 (compared to, for example, UAV(s) 106 with wings fixed in an outstretched configuration).

Further, in some embodiments, UAV 106 may include a plurality of propulsion mechanisms 510. In the illustrated embodiment of FIGS. 5A-5C, propulsion mechanisms 510 are depicted as tiltrotors, and each wing 504 has one tiltrotor 510 coupled thereto. Other propulsion mechanisms are contemplated, such as rigidly mounted propellers, turbines, ramjets, or any other technology used to propel fixed-wing aerial vehicles, as well as other embodiments in which each wing 504 has two or more tiltrotors coupled thereto. Where propulsion mechanisms 510 are embodied as tiltrotors, each tiltrotor is selectively movable between a first orientation relative to wing 504, also referred to as a horizontal orientation (see FIG. 5B), and a second orientation relative to wing 504, also referred to as a vertical orientation (see FIG. 5C) (e.g., in response to wind conditions or in response to a control signal from UAV control system 108). In some alternative embodiments, the tiltrotors (or other propulsion mechanisms 510) may also be moved as part of or in conjunction with wing(s) 504. Additionally, in some embodiments, the tiltrotors (or other propulsion mechanisms 510) may be movable in conjunction with each other, not independently, whereas in other embodiments, the tiltrotors (or other propulsion mechanisms 510) are movable independently.

UAV 106 employs wings 504 and propulsion mechanisms 510 to control movement of UAV 106 (e.g., lift, propulsion for movement in various directions, etc.). In accordance with the example embodiment, UAV 106 will exhibit fuel efficiency during delivery routines as well as launch routines, will have higher lift capabilities, and will be stable during launch even at highway speeds. Although UAV 106 is shown and described as a fixed-wing tiltrotor UAV, it should be understood that other embodiments of the systems and methods described herein may be implemented with other UAVs, such as a rotary-wing UAV or jet-powered UAV, although rotary-wing UAVs may be less suited for the high-turbulence environment of the in-motion ACV 102.

UAV 106 also includes one or more engagement components 520 configured to engage unit(s) (such as unit 124) during retrieval and delivery thereof. Engagement components 520 may include, for example, one or more hooks, clamps, claws, magnets, bands, support surfaces, or any other suitable component that enables UAV 106 to engage with, retrieve, and carry the unit(s) of inventory. In some embodiments, engagement components 520 maintain the inventory outside of body 502 of UAV 106, throughout retrieval and delivery. In some embodiments, UAV 106 includes a bay or compartment (not shown in FIGS. 5A-5C) within body 502. In such embodiments, engagement components 520 may be configured to retract or otherwise move the inventory unit(s) to a position within the bay.

In the embodiments shown in FIGS. 5A-5C, UAV 106 includes an onboard implementation of UAV control system 108, which is coupled in operative control communication with various components of UAV 106 and facilitates electronic (and, in some instances, automatic) control of UAV 106. For example, UAV control system 108 is configured to control UAV 106 according to stored or received controls, routines, processes, or operations, such as activation routines, stabilization routines, inventory retrieval routines, inventory delivery routines, vehicle engagement and disengagement routines, or any other functions described herein. As described above with respect to FIG. 4, UAV control system 108 includes a processing component (e.g., processor 402), a memory device (e.g., memory device 404), and a communication interface (e.g., communication interface 406).

UAV 106 may include additional components, including one or more sensors (e.g., inertial sensors, gyroscopes, accelerometers, GNSS receivers, etc.) and/or imaging devices (e.g., cameras, RADAR, LiDAR), in data communication with UAV control system 108 for operation of UAV 106. UAV control system 108 may be configured to interpret data from any such sensor or device, for real-time reactive control of UAV 106.

Figure 6A:
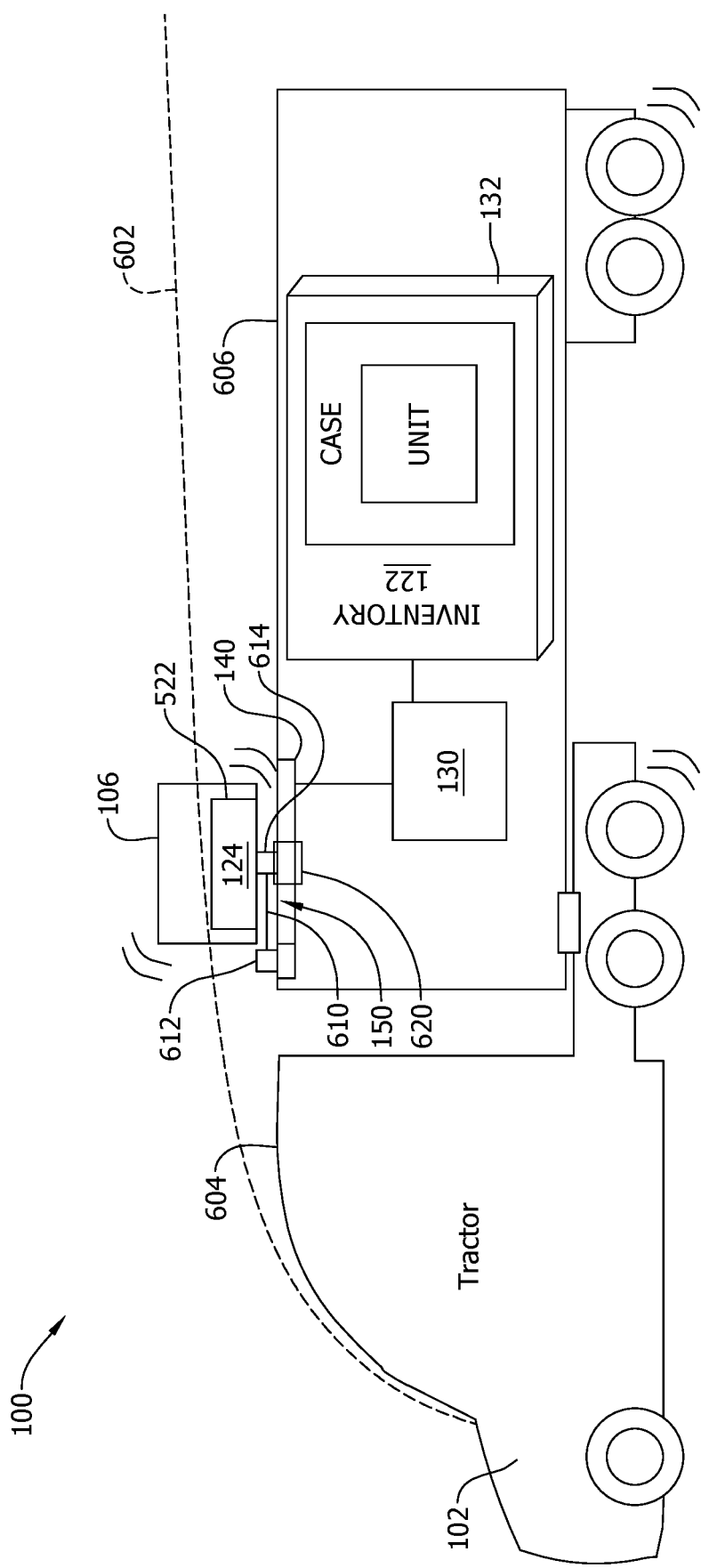
FIGS. 6A and 6B depict a simplified illustration of the delivery system shown in FIG. 1, including a UAV retrieving cargo from an in-motion cargo vehicle.
Figure 6B:
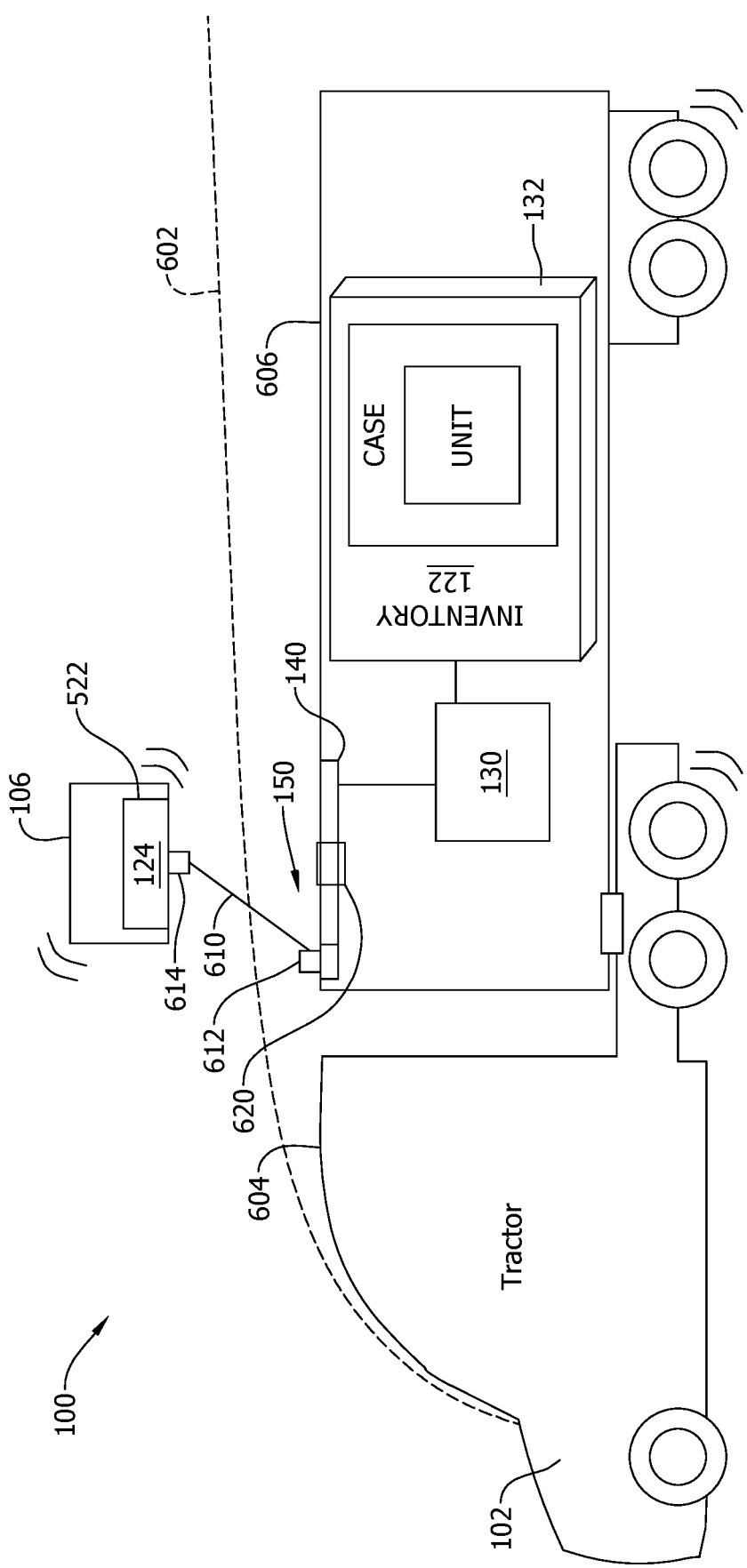

FIGS. 6A and 6B depict a first simplified illustration of delivery system 100 (shown in FIG. 1), in which ACV 102 is in motion and UAV 106 is conducting inventory retrieval therefrom. In particular, in the example embodiment, ACV 102 is travelling at highway speeds (e.g., greater than 40 MPH, such as 50 MPH, 60 MPH, or 70 MPH). Therefore, ACV 102 is surrounded by a turbulence envelope 602, which is typically larger and more chaotic as the speed of ACV 102 increases.

ACV 102, in the illustrated embodiment, includes a tractor 604 and a trailer 606, and retains inventory 122 in trailer 606. UAV 106 is initially stored on or in ACV 102. In other embodiments, UAV 106 is initially remote from ACV 102 and has approached ACV 102 to conduct an inventory retrieval process, for middle-mile delivery of inventory unit(s) from ACV 102 to a delivery location proximate to or along the route travelled by ACV 102.

In FIG. 6A, UAV 106 is coupled to ACV 102 via tethering assembly 150, including a tether 610, vehicle connector 612, and UAV connector 614. Additionally, inventory advancement assembly 152 (see FIG. 1; not shown in FIG. 6A) has been used to advance cargo—depicted as unit 124—through hatch 140 and to UAV 106. UAV 106 retains unit 124 in a bay 522 thereof.

Tethering assembly 150 is activated (e.g., by inventory management system 104, autonomy computing system 120, UAV 106, or UAV control system 108) to launch UAV 106 out of turbulence envelope 602. In the example embodiment, tethering assembly 150 is an active launch assembly, and includes a launching component 620 configured to apply a launching force to UAV 106.

FIG. 6B depicts UAV 106 as stabilized in equilibrium motion relative to ACV 102, outside of turbulence envelope 602. In the equilibrium motion, UAV 106 (e.g., a fixed-wing drone) is controlled to artificially "hover" above or otherwise relative to ACV 102. Hovering may be induced by propulsion mechanisms 510 of UAV 106, tethering assembly 150, or a combination thereof. As such, UAV 106 is moving at highway speeds, in equilibrium with the motion of ACV 102. Accordingly, once UAV 106 is released from ACV 102, UAV 106 has a significant initial velocity and is controlled (e.g., by UAV control system 108) to initiate a delivery routine by navigating to the delivery location based on, at first, the initial velocity.

To release UAV 106 from ACV 102, UAV connector 614 is released from UAV 106. For instance, UAV connector 614 may include an actuator that is controlled by UAV 106 to open or otherwise disconnect from UAV 106, and tether 610 is retracted back to ACV 102. Alternatively, UAV 106 includes a complementary actuable component that is decoupled from UAV connector 614.

In other embodiments, UAV 106 is decoupled from ACV 102 by releasing vehicle connector 612 from ACV 102. For instance, vehicle connector 612 may include an actuator that is controlled by inventory management system 104 or autonomy computing system 120 to open or otherwise disconnect from ACV 102, and tether 610 is retracted back to UAV 106. Alternatively, ACV 102 includes a complementary actuable component that is decoupled from vehicle connector 612.

Although shown as relative to trailer 606, the UAV launch routine may be implemented in part at tractor 604. That is, tractor 604 may include components of tethering assembly 150 (e.g., launching component 620, vehicle connector 612, tether 610, etc.).

Figure 7:
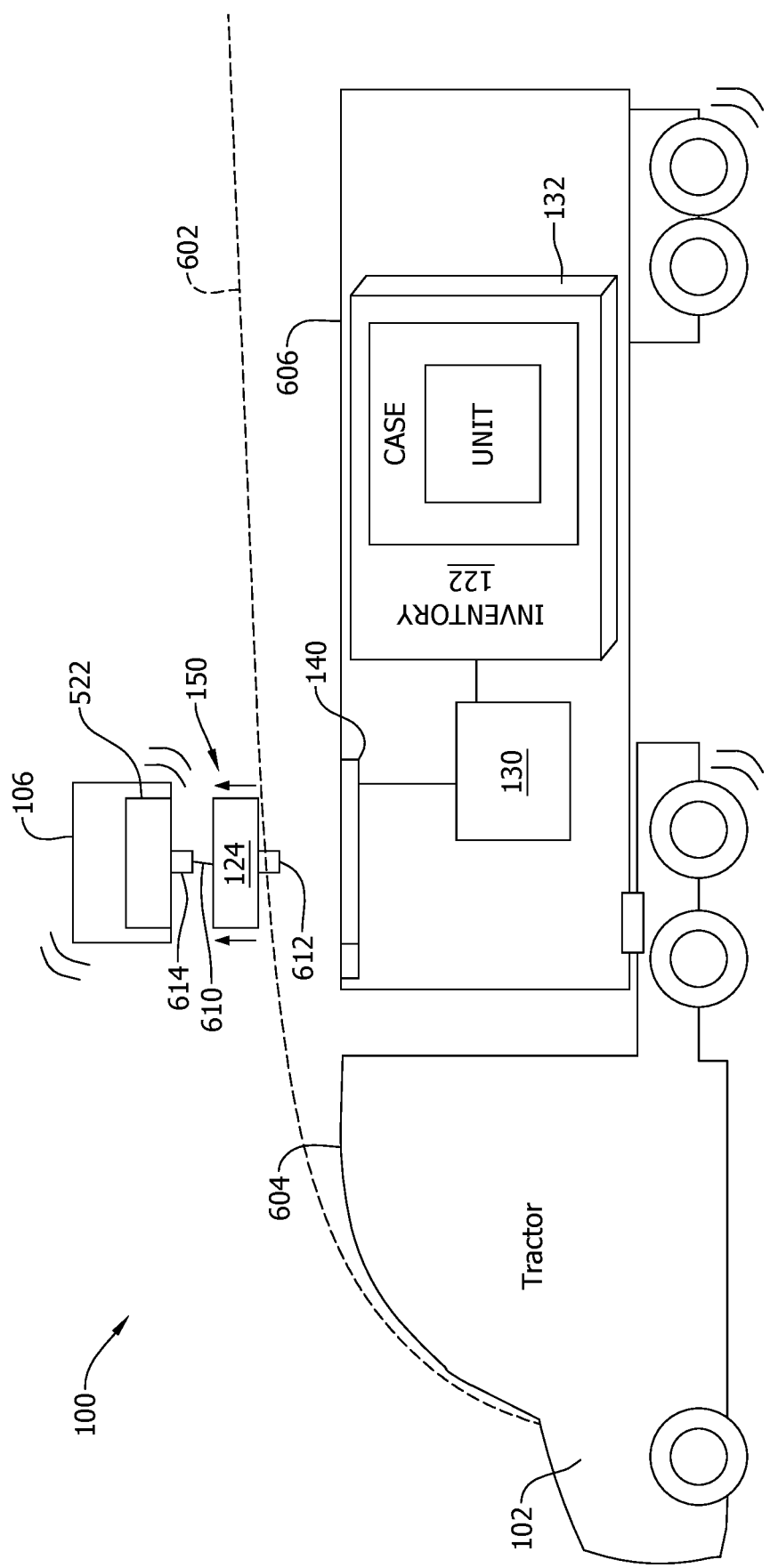
FIG. 7 depicts another simplified of illustration of the delivery system shown in FIG. 1.

FIG. 7 depicts another simplified illustration of delivery system 100. Similarly to the illustration shown in FIGS. 6A and 6B, UAV 106 is coupled to ACV 102 via tethering assembly 150, including tether 610, vehicle connector 612, and UAV connector 614. In this embodiment, however, UAV 106 has been launched before cargo—depicted as unit 124—has been advanced thereto. In some embodiments, UAV 106 is actively launched using launching component 620. In other embodiment, UAV 106 is launched using a passive launching routine or passive withdrawal routine, in which UAV 106 is controlled to lift itself from UAV 106 and exit turbulence envelope 602. Once withdrawn from turbulence envelope 602, UAV 106 stabilizes in equilibrium motion relative to ACV 102.

Inventory advancement assembly 152 is illustrated as being implemented, at least in part, in conjunction with tethering assembly 150. Specifically, tether 610 is utilized as an advancement path for advancing unit 124 to UAV 106, after UAV 106 is stabilized in equilibrium motion. In the illustrated embodiment, vehicle connector 612 is released from ACV 102, and UAV 106 retracts tethered 610 and unit 124 into bay 522. Once unit 124 is retained within UAV 106, UAV 106 is controlled (e.g., by UAV control system 108) to initiate a delivery routine by navigating to the delivery location.

In an alternative embodiment, inventory advancement assembly 152 is implemented as a surface-to-air recovery system. In particular, UAV 106 is stabilized and released from ACV 102. Subsequently, the cargo (e.g., unit 124) is released from hatch 140 and captured in midair by UAV 106, for example, using a tethering assembly (which may be similar to tethering assembly 150), a Fulton surface-to-air recovery system, a balloon assembly, or any other suitable surface-to-air transfer mechanism.

An example technical effect of the methods, systems, and apparatus described herein includes at least one of: (a) enabling order fulfillment and delivery of cargo from an in-motion cargo vehicle to an intermediate delivery location; (b) enabling inventory management within an in-motion cargo vehicle; (c) controlling a UAV to perform pick-up operations relative to an in-motion cargo vehicle, (d) providing a UAV capable of high-speed liftoff from an in-motion cargo vehicle traveling at highway speeds, (e) providing UAV launching and inventory advancement assemblies that enable launching a UAV from an in-motion cargo vehicle and advancing cargo to the UAV, or (f) enabling a UAV to artificially hover above an in-motion cargo vehicle with an equilibrium motion at highway speeds, with cargo or having cargo advanced thereto.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A delivery system comprising:
an autonomous vehicle comprising an autonomy computing system configured to control operation of the autonomous vehicle while the autonomous vehicle is in motion, the autonomous vehicle containing an inventory including a plurality of units;
a first unmanned aerial vehicle (UAV); and
a UAV control system configured to control operation of the first UAV, the UAV control system configured to, while the autonomous vehicle is in motion, control the first UAV to:
withdraw from a turbulence envelope of the autonomous vehicle while the first UAV is coupled to the autonomous vehicle;
stabilize in an equilibrium motion relative to the autonomous vehicle outside of the turbulence envelope while the first UAV is coupled to the autonomous vehicle;
engage a first unit of the plurality of units; and
disengage from the autonomous vehicle with the first unit engaged with the first UAV.

2. The delivery system of claim 1, wherein the autonomy computing system is configured to control the autonomous vehicle to move at highway speeds while the autonomous vehicle is in motion.

3. The delivery system of claim 1, wherein the first UAV comprises a pair of fixed wings and a plurality of propulsion mechanisms.

4. The delivery system of claim 1, further comprising a tethering assembly configured to couple the first UAV to the autonomous vehicle.

5. The delivery system of claim 4, wherein the first UAV is configured to disengage from the tethering assembly to disengage from the autonomous vehicle.

6. The delivery system of claim 4, wherein the tethering assembly is configured to engage the first unit of the inventory during retrieval of the first unit by the first UAV.

7. The delivery system of claim 4, wherein the first UAV comprises the tethering assembly.

8. The delivery system of claim 7, wherein the UAV control system is further configured to:
control the first UAV to travel with the first unit to a delivery location; and
activate an inventory deposit assembly including the tethering assembly to deposit the first unit at the delivery location.

9. The delivery system of claim 1, wherein the UAV control system is further configured to control the first UAV to withdraw from the turbulence envelope of the autonomous vehicle using a passive withdrawal routine.

10. The delivery system of claim 1, wherein the UAV control system is further configured to control the first UAV to withdraw from the turbulence envelope of the autonomous vehicle by activating a launching component coupled to the autonomous vehicle or the first UAV.

11. The delivery system of claim 1, further comprising an inventory advancement assembly configured to advance the first unit from the autonomous vehicle to the first UAV while the first UAV is coupled to the autonomous vehicle.

12. The delivery system of claim 11, wherein the autonomous vehicle has a hatch through which the inventory advancement assembly advances the first unit.

13. The delivery system of claim 12, wherein the autonomous vehicle comprises a tractor and a trailer, and wherein the hatch is defined through a roof surface of the trailer.

14. The delivery system of claim 12, wherein the autonomous vehicle comprises a tractor and a trailer, and wherein the hatch is defined through a roof surface of the tractor.

15. The delivery system of claim 11, wherein the inventory advancement assembly is a surface to air recovery system.

16. The delivery system of claim 1, wherein the first UAV comprises a pair of foldable fixed wings selectively movable between a folded configuration and an unfolded configuration, and wherein the first UAV is configured to transition the pair of foldable fixed wings from the folded configuration to the unfolded configuration before or while the first UAV stabilizes in the equilibrium motion.

17. The delivery system of claim 1, wherein the UAV control system is further configured to:
control the first UAV to travel with the first unit to a delivery location; and
deliver the first unit to the delivery location.

18. A method comprising:
controlling, by an autonomy computing system, an autonomous vehicle in motion, the autonomous vehicle containing an inventory, the inventory including a plurality of units;
controlling, by an unmanned aerial vehicle (UAV) control system, a first UAV to:
withdraw from a turbulence envelope of the autonomous vehicle while the first UAV is coupled to the autonomous vehicle;
stabilize in an equilibrium motion relative to the autonomous vehicle outside of the turbulence envelope while the first UAV is coupled to the autonomous vehicle;
engage a first unit of the plurality of units; and
disengage from the autonomous vehicle with the first unit engaged with the first UAV.

* * * * *